United States Patent [19]

Story

[11] 4,132,516
[45] Jan. 2, 1979

[54] APPARATUS REPAIRING DAMAGE TO A SURFACE

[76] Inventor: William Story, 16214 N. Nebraska Ave., Lutz, Fla. 33549

[21] Appl. No.: 817,602

[22] Filed: Jul. 21, 1977

[51] Int. Cl.² .................... B32B 35/00; B29C 11/00
[52] U.S. Cl. .................................. 425/13; 156/94; 156/382; 425/405 R; 425/12; 264/36
[58] Field of Search ............... 425/11, 12, 13; 156/94, 156/382; 264/36, 102, 23, 30

[56] References Cited

U.S. PATENT DOCUMENTS

| | | | |
|---|---|---|---|
| 3,202,732 | 8/1965 | Braun et al. | 264/30 |
| 3,837,965 | 9/1974 | Maliou et al. | 156/382 |
| 3,993,520 | 11/1976 | Werner et al. | 425/13 X |
| 4,032,272 | 6/1977 | Miller | 425/12 |
| 4,047,863 | 9/1977 | McCluskey et al. | 425/12 X |

*Primary Examiner*—J. Howard Flint, Jr.

[57] ABSTRACT

An apparatus is disclosed for repairing damage to a glass or plastic surface such as a safety glass windshield. The apparatus includes a substantially flat body member made of a flexible or rigid and transparent material. A disposable resilient intermediate member such as a paper product is provided with a generally central cut out region. The intermediate member is glued between the glass surface and the body member forming a cavity in the cut out region defined by the body member, the intermediate member and the glass surface. Access conduit through the body member enables insertion of a repair material into the cavity. A compressor and a vacuum pump are respectively connected by a first and a second valve to the access conduit for subsequently applying alternate vacuum and pressure to force the repair material into the damage in the glass surface. The intermediate member may then be removed from the glass surface. This abstract is a resume of one application, is not a complete discussion of all principles of operation or applications, and is not to be construed as a limitation on the scope of the claimed subject matter.

6 Claims, 2 Drawing Figures

APPARATUS REPAIRING DAMAGE TO A SURFACE

BACKGROUND OF THE INVENTION

1. Field of the Invention

This invention relates to repair and more particularly to the repair of a glass or plastic surface.

2. Description of the Prior Art

Various apparatuses and methods have been devised for repairing glass or plastic surfaces. For transparent glass or plastic surfaces, small defects substantially detract from the appearance of the transparent member when it is used for viewing such as a windshield for a motor vehicle or aircraft. Many motor vehicle windshields are damaged by flying debris and projectiles such as small rocks and other hard materials. In addition, many damages to windshields are caused by vandals using pneumatic B-B or pellet guns which cause small fractures in the windshield surface.

There are various types of fractures to windshield which may be classified in various ways. Basically, a windshield glass surface includes a first and second plate glass member laminated to an interposed plastic member to reduce shattering upon impact during collision. A projectile striking the external glass surface of the windshield generally causes a fracture in the shape of a cone. The apex of the cone is adjacent the external surface of the windshield and the base of the cone is adjacent the intermediate plastic member of the safety glass. In some cases, the cone is void of any damaged window glass whereas in other cases the cone may be partially or substantially totally filled with the particle or particles fractured from the glass windshield. In either case, the presence of air within the damage causes refraction of light which appears as a distortion within the window glass.

In order to repair the damage, the damaged area must be filled with a hardenable material which has a refractive index substantially equal to glass. This repair material must completely fill any voids within the damage region. Any discontinuity of either the glass or the repair material will cause refraction of light thereby adding distortion to the windshield.

Many devices have been devised in the past for injecting a glass repair material into a damage and for applying alternate vacuum and pressure in an attempt to completely fill the void of the damaged area. Some of the prior art devices incorporated a jig which was securable to the windshield through suction cups for positioning a syringe or like device over the damage in the windshield. Pressure from the syringe attempted to force the glass repair material into the damage. Others in the prior art used a syringe for providing alternate vacuum and pressure in an attempt to remove all gas from the damage and the glass repair material. Unfortunately, none of the prior art devices have accomplished the desired goal. Many of these devices cause extreme pressure on the glass windshield and in some cases cause a small damage to spread necessatiating the replacement of the entire windshield. In other cases, the syringe for injecting or for providing the vacuum and pressure was incapable of applying the vacuum and pressure effectively in order to accomplish the desired goal. Although the effective pressure was insufficient, the force exerted on the windshield was extremely high raising the ever present danger of damaging the windshield beyond repair. In most of these prior devices, a seal had to be formed between the syringe tip and the damaged area of the windshield. Generally, a resilient material was used for this seal which also required extreme pressure to properly seal the syringe to the damaged area.

Therefore it is an object of this invention to provide an apparatus which overcomes the aforementioned inadequacies of the prior art devices and provides an improvement which is a significant contribution to the advancement of the glass repair art.

Another object of this invention is to provide an apparatus for repairing a damage to a glass surface incorporating a substantially flat body member made of a transparent and flexible or rigid material such as glass or plastic which is glued to the glass surface through an intermediate disposable member having a central cut out region.

Another object of this invention is to provide an apparatus for repairing a damage to a glass surface wherein the combination of the body member and the intermediate member forms a cavity about the damage enabling the glass repair material to be inserted within the cavity to cover the damage in the glass surface.

Another object of this invention is to provide an apparatus for repairing a damge to a glass surface including alternate vacuum and pressure applied to the cavity for forcing the glass repair material into the damage while maintaining the pressure at less than fifty pounds per square inch.

Another object of this invention is to provide an apparatus for repairing a damage to a glass surface utilizing relatively simple materials with a superior process for repairing a damage to a glass surface.

A further object of this invention is to provide an apparatus for repairing a damage to a glass surface wherein the intermediate member is disposable for removing the body member from the glass surface.

Another object of this invention is to provide an apparatus for repairing a damage to a glass surface which has superior results than heretofore obtained by the prior art apparatuses and methods.

Another object of this invention is to repair glass without incurring or causing further damage to the object being repaired.

Other objects and a fuller understanding of this invention may be had by referring to the summary of the invention, the description and the claims, taken in conjunction with the accompanying drawings.

SUMMARY OF THE INVENTION

The invention may be incorporated in an apparatus for repairing a damage to a glass surface. The apparatus comprises a substantially flat body member having a first and a second surface. The body member may be a rigid or flexible material such as glass or plastic for reducing the stress applied to the glass surface to be repaired. The body member being transparent enables visual observation of the damage during the repairing process. A disposable semi-resilient intermediate member has a first and a second surface with a generally central cut-out region extending through the intermediate member. The intermediate member may be a paper product such as corrugated cardboard having an aperture punched therethrough for forming the central cut-out region. Means are provided for securing the first surface of the intermediate member to the glass surface and for securing the second surface of the intermediate member to the first surface of the body member forming a cavity in the cut-out region of the intermediate member. The cavity is defined by the glass surface, the intermediate member, and the flat body member with the damage located within the cavity. The intermediate member and the body member may be secured by a glue which remains substantially flexible upon curing.

Access means is provided through the body member for communication with the cavity to insert the glass repair material to repair the damage. More specifically, the access means includes a conduit extending through the body member having a coupling device such as a quick connect coupling. The glass repair material is inserted into the cavity and covers the damage in the glass surface. A compressor and a vacuum pump are respectively connected by a first and a second valve to the coupling device. Accordingly, after insertion of the glass repair material, alternate vacuum and pressure is applied to the cavity for forcing the glass repair material into the damage. The vacuum force is of course restricted to less than fifteen pounds per square inch. However, in this process, a positive pressure of less than fifty pounds per square inch provides superior results than heretofore found in the prior art.

The invention may also be incorporated into the method of repairing a damage to a glass surface comprising the steps of glueing an intermedicate member having a cut out region to the glass surface with the cut out region located over the damage and with the remainder of the intermediate member surrounding the damage in the glass surface. The method includes glueing a substantially flat transparent body member to the intermediate member thereby forming a closed cavity in communication with the damage. Glass repair material is applied through access means in the body member to cover the damage with the repair material in the cavity. Alternate vacuum, gas or air pressure is applied to the cavity to force the repair material into the damage in the glass surrace. Finally, the intermediate member, the body member and the glue is removed from the glass surface.

This invention accordingly comprises an apparatus possessing the features, properties and the relation of elements which will be exemplified in the apparatus and method, hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
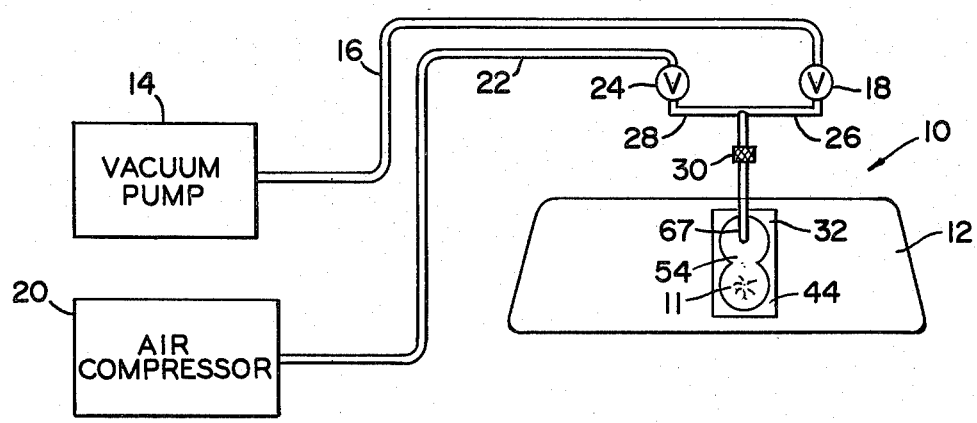
FIG. 1 illustrates a glass repair apparatus mounted for repairing a windshield of a vehicle.
Figure 2:
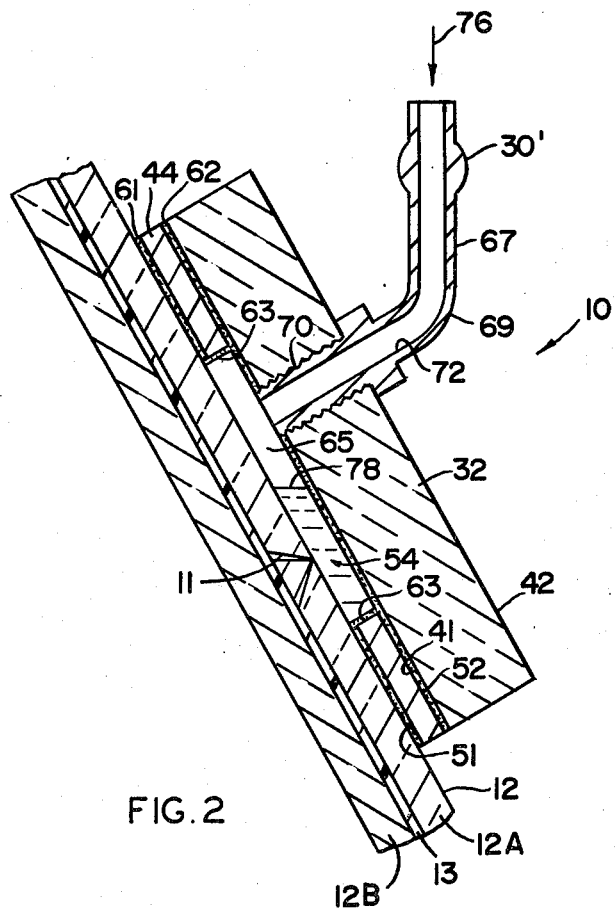
FIG. 2 is a enlarged side sectional view showing a portion of the specific apparatus for repairing a glass surface.

FIGS. 1 and 2 illustrate an apparatus 10 and a process for repairing a damage 11 to a glass surface 12. The glass surface 12 is shown as a windshield of a motor vehicle but it is understood that the invention may be used to repair other types of glass and plastic surfaces. The apparatus 10 is also shown exaggerated in size relative to the windshield 12 for clarity. A vacuum pump 14 which may include either a piston or a rotary vacuum pump is connected by a flexible conduit 16 to a needle valve 18. Air compressor means 20 which may include a compressor, a pressure tank, associated gauges, and a regulator is connected through a flexible conduit 22 to a needle valve 24. Valves 18 and 24 are connected by conduits 26 and 28 to a quick connect coupling 30. Manipulation of valves 18 and 24 will apply alternate vacuum and pressure to the coupling 30 as will be hereinafter described.

The apparatus 10 includes a substantially flat body member 32 having a first and a second surface 41 and 42 respectively. The body member 32 is preferably made of a transparent material such as glass or plastic, and is slightly flexible for relieving stress on the glass windshield 12. It has been found that three-eighths plate glass is suitable for use with the disclosed apparatus and process.

An intermediate member 44 comprises a first and a second surface 51 and 52 with a generally central cut out region 54. The intermediate member 44 is preferably made of a disposable material such as a paper product. It has been found that corrugated cardboard is satisfactory for use with the invention.

The windshield 12 more specifically is illustrated as a first and a second glass surface 12A and 12B with a centrally disposed plastic layer 13 bonding the glass layer 12A to glass layer 12B. This glass arrangement is referred to as safety glass which prevents the glass layers 12A and 12B from shattering upon impact. The damage 11 is shown as a conical damage with the apex of the cone adjacent the outer surface of glass member 12A and with the base of the cone being adjacent the plastic layer 13. A first glue layer 61 glues the first surface 51 of the intermediate member 44 to the outer surface of glass member 12A. A second glue layer 62 bonds the second surface 52 of the intermediate member 44 to the first surface 41 of the body member 32. A third glue layer 63 seals the corrugations in the cut-out region 54 of the intermediate member 44. If a non permeable intermediate member 44 is used, then the third glue layer 63 may be deleted. The position of the glass surface 12A in combination with the intermediate member 44, the body member 32 and the glue layers 61-63 from a cavity 65. A conduit 67 having an elbow 69 is secured by threads 70 or other means to provide fluid communication through the body member 32 by channel 72. A quick connect coupling portion 30' forms a portion of the coupling 30 shown in FIG. 1 for coupling the channel 72 to conduits 26 and 28.

The apparatus and process for repairing the damage 11 to the glass surface 12 proceeds as follows. The first glue layer 61 is applied to bond the intermediate member 44 to the glass surface 12A with the damage 11 being located below the termination of channel 72 as shown by angle of the vehicle windshield in FIG. 2, The second and third glue layers 62 and 63 bond the body member 32 in position as shown forming cavity 65. The glass repair material is deposited through channel 72 as illustrated arrow 76 to at least partially fill the cavity 65 thus insuring that the damage 11 is completely covered by the glass repair material 78. The glass repair material 78 may be inserted through channel 72 by an eyedropper or the like. Since the damage 11 is located below the termination of channel 72, the glass repair material 78 will flow by action of gravity to cover the damage 11 leaving an air space above. Coupling 30 is then secured and alternate vacuum and gas or air pressure is applied to cavity 65 thereby forcing the glass repair material 78 into the damage 11. The transparent body member 32 enables the operator to visually observe the entire process. Upon the completion of forcing the glass repair material 78 into the damage 11, the intermediate member 44 and the body members 32 are removed from the glass 12. This can be accomplished by forcing a pointed instrument into the intermediate member 44 thus destroying the member 44. The body member 32 is then removed from the glass 12. The glue layers 61-63 preferably remain slightly resilient after curing. The body member 32 may be reused with a new intermediate member 44 for a subsequent damage. Traces of glue layer 61 on the windshield 12 may be removed by a sharp instrument such as a razor blade, solvent or the like.

The process and apparatus heretofore described has been substantially tested under a variety of damages to glass surfaces. It is believed that this unique method and apparatus provides superior results than heretofore found in the prior art.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

I claim:

1. An apparatus for repairing a damage to a glass surface, comprising in combination:
   a flat body member having a first and a second surface;
   said body member being transparent for enabling visual observation of the damage during the repairing process;
   a disposable resilient intermediate member having a first and a second surface;
   said intermediate member being a sheet commensurate in size with said flat body member and having a generally central cut out region;
   means for glueing said first surface of said intermediate member to said glass surface and for glueing said second surface of said intermediate member to said first surface of said body member forming a cavity in said cut out region with said damage located in said cavity;
   access means in said body member communicating with said cavity for inserting a glass repair material to repair the damage; and;
   said access means including a conduit extending through said body member having a coupling device for enabling insertion of said repair material through and for enabling application of a varying pressure in the cavity region of said intermediate member.

2. An apparatus as set forth in claim 1, including a quick connect coupling extending from said body member for enabling insertion of the repair material and application of the variable pressure.

3. An apparatus as set forth in claim 1, wherein said body member is slightly flexible for reducing stress applied to the glass surface.

4. An apparatus as set forth in claim 1, wherein said body member is a glass member.

5. An apparatus as set forth in claim 1, wherein said intermediate member is a paper product.

6. An apparatus as set forth in claim 1, including a compressor and vacuum pump respectively connected by a first and a second valve to a coupling device.

* * * * *